UNITED STATES PATENT OFFICE.

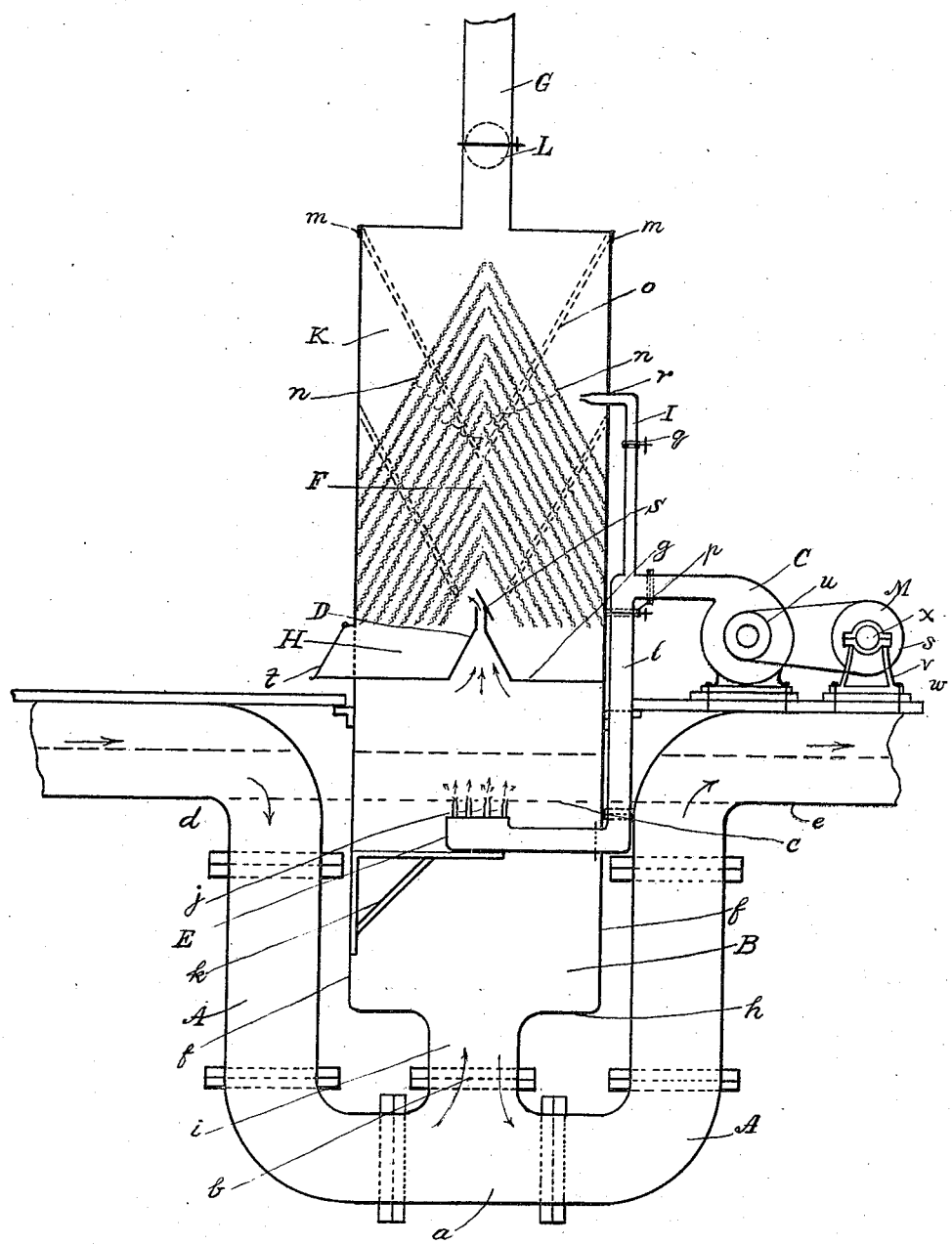

JOHN P. BALL, OF CHICAGO, ILLINOIS.

SEWAGE PURIFIER.

1,415,007.   Specification of Letters Patent.   Patented May 9, 1922.

Application filed October 29, 1920, Serial No. 420,438. Renewed March 8, 1922. Serial No. 542,199.

*To all whom it may concern:*

Be it known that I, JOHN P. BALL, a citizen of the United States, residing in Chicago, in the county of Cook and State of Illinois, United States of America, have invented a certain new and useful Improvement in Sewage Purifiers, of which the following is a specification.

This invention relates to a device for agitating atomizing and evaporizing and collecting sewage sludge by utilizing a fluid current, and aims to provide certain improvements therein.

My invention provides improvements especially applicable to devices for treating sewage by agitation and condensation, and utilizes the action of compressed air in combination with sewage sludge to be treated, evaporating the liquids, condensing and comminuting the suspended organic and inorganic matter.

In its preferred form my invention utilizes a sludge collecting chamber containing an initial agitator and evaporator in the form of an atmospheric air blower, a condensing chamber composed of a plurality of superposed conical screens, an intermediate blower pipe communicating between said collecting chamber and condensing chamber, a supplementary blower for drying the sludge, and a clean-out passage for the so treated sludge, means for agitating and evaporizing the liquid sludge, means for condensing the suspended matter therein and means for exhausting the sewer gas to an elevated plane.

My invention also includes means for the air currents; improved damper arrangements and various features of improvement in construction, arrangements and details all of which will be more fully herein set forth.

In the accompanying drawings, which shows the adaptation of my invention, the figure is a vertical axial section showing the preferred form of my invention.

Referring to the drawings, A indicates a sewer trap or sump, B a sludge collecting chamber, C a blower, D a blower pipe, E is an air discharge pipe, F a series of baffle cones, G an exhaust gas vent, H a dry material collecting chamber, I a supplementary air jet, K is the main condensing chamber, L a damper in gas vent, M is the motive power.

Referring to the figure I will now describe in detail the preferred form of my invention in the adaptation therein illustrated.

The sewer trap or sump A, is made of a special pipe fitting of four 90 degree bends and three straight lengths so that when they are bolted together, forms a U shaped trap, the special pipe fitting "A" is provided with a suitable opening "$b$" so as to allow the sludge to enter the collecting chamber "B" and rise to the level of the invert of the sewer pipe "$c$." The sewage entering the trap at "$d$" and passing outward at "$e$" it is evident that the heavier particles in form of sludge are collected in the trap in the chamber "B" while the liquid flows onward and outward through the sewer at "$e$."

The sludge collecting chamber "B" is constructed of suitable material such as sheet iron, it has a cylindrical body "$f$" and a flat annular top and bottom $g$ and $h$. The bottom $h$ is provided with a circular intake connecting pipe $i$ to allow the free flow of sewage between the sewer and the sludge collecting chamber, this connecting pipe forms a part of the collecting chamber and is bolted to upper part of the special pipe fitting at $b$ which forms a support for the mechanism. The top of the sludge collecting chamber $g$ is provided with a truncated conical shaped pipe "D" and a flap valve "S" which allows the flow of evaporated sewage sludge into the condensing chamber, as will be described later.

In the center of the sludge collecting chamber "B" and directly below the line of sewer invert $d$ is located an evaporator "E" which consists of a metal drum and supplied with a series of air jet openings $j$ so as to allow forced air to pass through the sewage sludge. This drum is supported on a bracket $k$ which is fastened to the body frame "$f$", the blower "C", consists of a series of whirling blades and by centrifugal force discharges air into the tubular passage 1 and into the drum "E" and discharged air into the sewage sludge through the jet pipes $j$, the blower "C" is driven by motive power mechanism as shown M which consists of the usual pulley and band combination.

As the forced air is discharged through the jets $j$, agitation takes place in the liquid sludge, the air becomes saturated with the sewage and is forced through the opening "D" into the condensing chamber "K" where it is inspissated, the gases are further exhausted through the vent pipe "G" to the atmosphere above at an elevated plane.

The condensing chamber K as shown has a cylindrical body with an annular top and bottom, it is constructed of any suitable material preferably sheet iron, and is located on top of the collecting sludge chamber and fastened thereto by bolts or rivets, so that the blower pipe "D" enters the bottom of the condensing chamber and allows a free passage of saturated sewerage gas thereto. The condensing chamber is also provided with a series of conical shaped superimposed screens $n$ $n$ constructed of wire mesh and covered with cloth, each cone being held in position by metal spider supports "O" which are fastened to the screen at the one end and to the body of the condensing chamber at the other end. At the upper part of the condensing chamber a vent pipe "G" is attached and allows free communiction thereto, this vent pipe is provided with a damper "L" so as to regulate the current of air and for use as a shut off damper when so needed.

In order to dry the collected particles in the screens, a supplementary air jet "I" is provided, communicating with the blower "C" and the condensing chamber K as shown entering the body of the condensing chamber at $r$, this supplementary air jet supplies dry air intermittingly by the operation of a stop valve $q$ connected to the piping.

The driving mechanism "M" as shown consists of a driving shaft $x$ and a pully $s$, which is belted to the driving pully $u$ which propels the fan blower, the driving shaft $x$ and pully $s$ are mounted on a bearing frame $v$, which frame is shown bolted to the flooring W, the blower is also shown bolted to the same flooring.

The discharge outlet $t$ is preferably a hinged door, air tight when closed and connects with the lower portion of the reduction drum.

The baffle cones F as further shown are constructed by a series of reverse and return passages whereby the sewer gas comes in contact with the surface of the baffle cones and while passing, the particles of organic matter and inorganic matter that may be held in suspension in the fluid current are caught by the mesh of the screens.

The exhaust stack "G" is provided with a damper "L" which when closed permits the compressed air from jet "I" to frequent the conical baffles and forces the dust through the system of conical screens "F" suspended in the casing "K" by means of braces "O" and the lugs MM. The top of the casing "K" is provided with a movable cover so that the system of conical screens can be removed axially from the casing.

The main air tube $l$ is provided with a stop-valve $p$ located in the piping and when closed, transfers the air to the dry air shaft "I". In operation the sludge being allowed to collect in the chamber "B" to the flow line "C", or in sewer traps where the sludge will float to the surface of sewage flow, the valves p. S. and L being open and the valve $q$ and the door $t$ closed, the fan blower "C" is set in operation, and air is driven through the liquid sludge through the jets $j$, it is evident that the air in passing through the sludge becomes charged with the suspended matter therein, the condensing chamber being located directly above the collecting chamber the charged air will rise through the blower pipe "D" and enter the baffle screens F. It is also evident that suspended particles in the charge current of air will be caught and held on the baffle screens while the sewer gas exhaust to the atmosphere through the vent pipe G. My purpose in using cloth covered screens is that the suspended particles will adhere more closely thereto. After the fan "C" has been in operation a sufficient length of time to free the sewer trap of sludge, and the baffle screens "F" are contained, with sludge or wastes, the valve $p$ is closed and the damper "L" is closed, the valve $q$ is opened and dry air is allowed to flow through the screens; the clean out door $t$ is then opened for the purpose of taking off the condensed and dried material.

Having thus described my invention, what I claim is:

1. In sewage purifiers and similar devices, the combination with a casing having an upper condensing chamber and a lower sludge collecting chamber, said lower sludge collecting chamber being located in a pit below the surface of the sewage and containing a plurality of forced air passages, said condensing chamber containing a series of baffle screens, means for creating a sludge laden air current and means for condensing such sludge laden air current on said baffle screens.

2. In sewage purifiers and similar devices the combination with a casing containing a condensing chamber and a sludge collecting chamber, means for supplying the sludge thereto, and means for creating an air current therein through such sludge, of means discharging sludge laden currents into the condensing chamber and means for discharging the sewer gas into the atmosphere at an elevated plane.

3. In sewage purifiers and similar devices the combination with a condensing chamber containing a plurality of conical shaped sceens of fiber fabric mesh, means for creating a current of forced air through the sludge to be treated, means for causing sludge laden currents and means for condensing the suspended organic matter in its upward flowing strata.

4. In sewage purifiers and similar devices the combination of a casing having an upper condensing chamber and a lower collecting chamber communicating with each other, means for supplying sewage to the collecting chamber and means for discharging the effluent from said collecting chamber, means for collecting the sludge to be treated, means for supplying a current of forced air to said sludge, means for extracting particles of organic matter from said sludge in the path of said current, means for condensing the entrained particles, means for drying said particles and means for discharging the dried material.

5. In sewage purifiers of the class described the combination of a casing having an upper condensing chamber and a lower sludge chamber, means for supplying sludge to the lower chamber, means for creating a sludge laden air current and means for discharging said sludge laden air current into the condensing chamber, means for condensing said sludge laden current, means for supplying a current of dry air to the condensing chamber and means for regulating the supply of air and means for controlling the air currents.

JOHN P. BALL.

Witnesses:
E. M. BALL,
A. M. BALL.